United States Patent
Liu et al.

(10) Patent No.: US 9,853,506 B2
(45) Date of Patent: Dec. 26, 2017

(54) RESONANT WIRELESS POWER RECEIVER CIRCUIT AND CONTROL CIRCUIT AND WIRELESS POWER CONVERSION METHOD THEREOF

(71) Applicant: RICHTEK TECHNOLOGY CORPORATION, Zhubei, HsinChu (TW)

(72) Inventors: Kuo-Chi Liu, Hsinchu (TW); Wei-Hsin Wei, Zhubei (TW)

(73) Assignee: RICHTEK TECHNOLOGY CORPORATION, Zhubei, Hsinchu (TW)

( * ) Notice: Subject to any disclaimer, the term of this patent is extended or adjusted under 35 U.S.C. 154(b) by 78 days.

(21) Appl. No.: 15/154,792

(22) Filed: May 13, 2016

(65) Prior Publication Data

US 2016/0336811 A1 Nov. 17, 2016

Related U.S. Application Data

(60) Provisional application No. 62/161,912, filed on May 15, 2015.

(51) Int. Cl.
| | |
|---|---|
| H01F 27/42 | (2006.01) |
| H01F 37/00 | (2006.01) |
| H01F 38/00 | (2006.01) |
| H02J 50/12 | (2016.01) |
| H02M 7/219 | (2006.01) |
| H02M 7/217 | (2006.01) |

(52) U.S. Cl.
CPC ............ *H02J 50/12* (2016.02); *H02M 7/217* (2013.01); *H02M 7/219* (2013.01); *Y02B 70/1441* (2013.01)

(58) Field of Classification Search
USPC .................................................. 307/104, 108
See application file for complete search history.

(56) References Cited

U.S. PATENT DOCUMENTS

| | | | | |
|---|---|---|---|---|
| 2009/0174263 A1* | 7/2009 | Baarman | ................. | H02J 5/005 307/104 |
| 2014/0077696 A1* | 3/2014 | Kuennen | ................... | A61L 2/10 315/34 |
| 2015/0035376 A1* | 2/2015 | Baarman | ................. | H02J 5/005 307/104 |

(Continued)

*Primary Examiner* — Adam Houston
(74) *Attorney, Agent, or Firm* — Tung & Associates

(57) ABSTRACT

The present invention provides a resonant wireless power receiver circuit, comprising: a resonant circuit for receiving a wireless power to generate a AC resonant signal which has an amplitude; a bridge rectifier circuit which includes a multi-mode switch, for rectifying the AC resonant signal to a rectifier output signal to drive a load, wherein the rectifier output signal includes a rectifier output voltage and a rectifier output current; and a feedback control circuit for generating a switch control signal according to a feedback signal related to the rectifier output signal to control the multi-mode switch to operate in a Conductive Operation at least for a partial time in a cycle period, such that the rectifier output voltage is substantially twice the amplitude, or the rectifier output voltage corresponds to an output voltage reference and/or the rectifier output voltage corresponds to an output current reference.

24 Claims, 6 Drawing Sheets

(56) References Cited

U.S. PATENT DOCUMENTS

| | | | | |
|---|---|---|---|---|
| 2015/0302983 | A1* | 10/2015 | Park | H02J 50/12 |
| | | | | 320/108 |
| 2016/0006267 | A1* | 1/2016 | Muratov | B60L 11/1812 |
| | | | | 307/104 |
| 2016/0013663 | A1* | 1/2016 | Zhang | H01F 38/14 |
| | | | | 307/104 |
| 2016/0043568 | A1* | 2/2016 | Raghunathan | H02J 5/005 |
| | | | | 307/104 |
| 2016/0056640 | A1* | 2/2016 | Mao | H02J 50/80 |
| | | | | 307/104 |
| 2016/0254679 | A1* | 9/2016 | Liu | H02J 50/12 |
| | | | | 307/104 |

* cited by examiner

RESONANT WIRELESS POWER RECEIVER CIRCUIT AND CONTROL CIRCUIT AND WIRELESS POWER CONVERSION METHOD THEREOF

CROSS REFERENCE

The present invention claims priority to U.S. 62/161,912, filed on May 15, 2015.

BACKGROUND OF THE INVENTION

1. Field of Invention

The present invention relates to a resonant wireless power receiver circuit, particularly, to a resonant wireless power receiver circuit with a bridge rectifier circuit. The present invention also relates to a control circuit and a resonant wireless power conversion method.

2. Description of Related Art

FIG. 1 shows a prior art resonant wireless power receiver circuit 1. The resonant wireless power receiver circuit 1 comprises a resonant circuit 31, a bridge rectifier circuit 33, a DC-DC converter 34 and a load 35.

The wireless power transmission is achieved as thus. In FIG. 1, a resonant wireless power transmitter circuit (not shown) transmits a wireless power 40 to a wireless field (for example but not limited to a magnetic field, an electric field or an electromagnetic field). The wireless power 40 in the wireless field is received by the resonant wireless power receiver circuit 1 with the resonance effect of the resonant circuit 31 through for example but not limited to coupling, induced by, or capturing the wireless power 40 in the wireless field. A resonant output voltage VAC is generated at an output of the resonant circuit 31. The rectifier circuit 33 rectifies the resonant output voltage VAC to generate a rectified output voltage VRECT which is then converted by the DC-DC converter 34 to generate an output voltage VOUT to drive the load 35.

The prior art in FIG. 1 has a drawback that the rectified output voltage VRECT may be too low or too high. And, due to the uncertain level of the rectified output voltage VRECT, an extra regulation circuit (e.g. DC-DC converter 34) is required to generate a stable output voltage.

Since the operation of the prior art shown in FIG. 1 is based on resonance effect, if the resonant frequency transmitted by the resonant wireless power transmit circuit drifts from its preset frequency, or if the receiver circuit is not properly located at a proper relative distance and a proper relative angle, or if there are multiple resonant wireless power receiver circuits coupled to receive the wireless power at the same time, off resonance could happen. If the off resonance is not corrected or controlled, it could cause power loss, or the received voltage (for example the resonant output voltage VAC and the rectified output voltage VRECT) could be too low such that circuits at the following stage (such as the DC-DC converter 34 and the load 35) cannot function properly.

FIG. 2 shows a Bridge Doubler Rectifier according to a prior art rectifier circuit disclosed by U.S. Pat. No. 4,268,899. When CR5 is not conductive, the Bridge Doubler Rectifier operates in 1× voltage mode, and when CR5 is conductive, it operates in 2× voltage mode. The prior art in FIG. 2 has the following drawbacks: (A) it requires two output capacitors connected to each other in series, so the equivalent capacitance is half of that of a single capacitor; (B) CR5 has to be a bi-directional control switch; (C) there are only two options for its output voltage, nevertheless as mentioned previously, since the power received by the resonant wireless power receiver circuit with resonance effect is uncertain, the output voltage generated by the prior art rectifier may be too low in 1× mode and too high in 2× mode, i.e., neither 1× nor 2× is proper, which may lead to malfunction or damage of circuits in its following stages.

FIGS. 3A and 3B show another prior art resonant wireless power receiver circuit. The resonant wireless power receiver circuit 2 includes a 1×/2× active rectifier 38 (the details thereof are shown in FIG. 3B). The 1×/2× active rectifier 38 can rectify the wirelessly received AC voltage to a selectable one time (1×) or two times (2×) rectified output voltage to solve the aforementioned low output voltage problem of the rectifier.

However, the prior art circuits shown in FIG. 3A-3B have the following drawbacks. First, the circuit of 1×/2× active rectifier 38 is very complicated and needs a large number of devices. Second, there are only two options for the output voltage. However, as described in the above, the level of the resonant power received by the resonant wireless power receiver circuit 2 is uncertain, and it is possible in certain circumstances that 1× is too low while 2× is too high, such that the circuits of the following stages either cannot function normally or are damaged.

Compared to the prior art in FIG. 1, the present invention has an advantage that the rectifier output is feedback controlled, such that the output voltage of the rectifier circuit is not too high nor too low. Another important advantage is that, since the present invention provides a stable rectifier output voltage or current, the DC-DC converter can be omitted, which greatly reduces the cost.

Compared to the prior art in FIGS. 2, 3A and 3B, the present invention has an advantage that the rectifier output is adjustable in a continuous way, such that the output voltage of the rectifier circuit is not too high nor too low. Another advantage is that the present invention can operate with less components and can share inherent components of the original rectifier circuit, so the present invention can reduce the manufacture cost.

SUMMARY OF THE INVENTION

From one perspective, the present invention provides a resonant wireless power receiver circuit, comprising: a resonant circuit, including: a receiver circuit which includes at least a receiver coil; and an impedance matching circuit which is coupled to the receiver circuit, including at least one impedance matching capacitor; wherein the resonant circuit is configured to operably receive a wireless power to generate an AC resonant signal between a positive resonant output node and a negative resonant output node, and the AC resonant signal includes an AC resonant voltage, and the AC resonant voltage has an amplitude; a bridge rectifier circuit, configured to operably convert the AC resonant signal to generate a rectified output signal between a rectified output node and a ground node, wherein the rectified output signal includes a rectified output voltage and a rectified output current, wherein the bridge rectifier circuit includes at least four rectifier devices, wherein each of the four rectifier devices has a current outflow node and a current inflow node, wherein the four rectifier devices include a first rectifier device, a second rectifier device, a third rectifier device, and a forth rectifier device, and the current outflow nodes of the third rectifier device and the forth rectifier device are connected to each other at a rectified output node, and the current inflow nodes of the first rectifier device and the second rectifier device are connected to each other at a ground node, and the current inflow node of the third rectifier device and the current outflow node of the first rectifier device are connected to each other at the negative resonant output node, and the current inflow node of the forth rectifier device and the current outflow node of the second rectifier device are connected to each other at the positive resonant output node, wherein at least one of the four rectifier devices is a multi-mode switch, wherein the impedance matching capacitor is connected in series between the receiver circuit and the bridge rectifier circuit; and a feedback control circuit, configured to operably generate a multi-mode switch control signal for controlling the multi-mode switch to operate at least in a portion of time in the Conductive Operation according to a voltage feedback signal related to the rectified output voltage and/or a current feedback signal related to the rectified output current so as to achieve the following functions: (A) such that the voltage level of the rectified output voltage is substantially twice the amplitude of the AC resonant voltage; or (B) to regulate the rectified output voltage at a level corresponding to a level of an output voltage reference signal, and/or to regulate the rectified output current at a level corresponding to a level of an output current reference signal.

In one embodiment, the feedback control circuit controls the multi-mode switch by the multi-mode switch control signal, such that the multi-mode switch operate in a time-divided combination of a Synchronous Rectifying Switching Operation, and a Conductive Operation to regulate the rectified output voltage at the level corresponding to the level of the output voltage reference signal, and/or to regulate the rectified output current at the level corresponding to the level of the output current reference signal.

In one embodiment, the four rectifier devices are configured as (A), or (B), or (C), or (D): (A) the four rectifier devices include a multi-mode switch and three diodes, wherein the anode and the cathode of each of the three diodes correspond to the current inflow node and the current outflow node of each of the three diodes respectively, and the feedback control circuit controls the multi-mode switch by the multi-mode switch control signal; (B) the four rectifier devices include four multi-mode switches, wherein the feedback control circuit controls the four multi-mode switches by the multi-mode switch control signal; (C) the four rectifier devices include a combination of a diode and three multi-mode switches, wherein the anode and the cathode of the diode correspond to the current inflow node and the current outflow node of the diode respectively, and the feedback control circuit controls the three multi-mode switches by the multi-mode switch control signal; (D) the four rectifier devices include a combination of two diode and two multi-mode switches, wherein the anode and the cathode of the two diodes correspond to the current inflow node and the current outflow node of the two diodes respectively, and the feedback control circuit controls the two multi-mode switches by the multi-mode switch control signal.

In one embodiment, each of the multi-mode switches includes a semiconductor switch.

In one embodiment, the bridge rectifier circuit further includes one or plural bypass diodes of which the number corresponds to the number of the one or plural multi-mode diodes, and each of the multi-mode switches is connected to one individual diode of the one or plural bypass diodes in parallel respectively, and the anode and the cathode of each of the bypass diodes correspond to the current inflow node and the current outflow node of each of the multi-mode switches respectively.

In one embodiment, the resonant wireless power receiver circuit further includes an output capacitor which is connected between the rectified output node and the ground node, wherein when the level of the rectified output voltage is configured to be substantially twice the amplitude of the AC resonant voltage, the impedance capacitor is charged by the AC resonant voltage during a negative half wave voltage of AC resonant voltage, and the impedance capacitor charges the output capacitor during a positive half wave voltage of AC resonant voltage.

From another perspective, the present invention provides a resonant wireless power receiver circuit, comprising: a resonant circuit, including: a receiver circuit which includes at least a receiver coil; and an impedance matching circuit which is coupled to the receiver circuit, including at least one impedance matching capacitor; wherein the resonant circuit is configured to operably receive a wireless power to generate an AC resonant signal between a positive resonant output node and a negative resonant output node, and the AC resonant signal includes an AC resonant voltage, and the AC resonant voltage has an amplitude; a bridge rectifier circuit, configured to operably convert the AC resonant signal to generate a rectified output signal between a rectified output node and a ground node, wherein the rectified output signal includes a rectified output voltage and a rectified output current, wherein the bridge rectifier circuit includes at least four rectifier devices, wherein each of the four rectifier devices has a current outflow node and a current inflow node, wherein the four rectifier devices include a first rectifier device, a second rectifier device, a third rectifier device, and a forth rectifier device, and the current outflow nodes of the third rectifier device and the forth rectifier device are connected to each other at a rectified output node, and the current inflow nodes of the first rectifier device and the second rectifier device are connected to each other at a ground node, and the current inflow node of the third rectifier device and the current outflow node of the first rectifier device are connected to each other at the negative resonant output node, and the current inflow node of the forth rectifier device and the current outflow node of the second rectifier device are connected to each other at the positive resonant output node, wherein at least one of the four rectifier devices is a multi-mode switch, wherein the impedance matching capacitor is connected in series between the receiver circuit and the bridge rectifier circuit; and a control circuit, configured to operably generate a multi-mode switch control signal for controlling the multi-mode switch to operate in a Conductive Operation according to a mode selection signal, such that the voltage level of the rectified output voltage is substantially twice the amplitude of the AC resonant voltage.

From another perspective, the present invention provides a feedback control circuit, configured to operably control a resonant wireless power receiver circuit which comprises: a resonant circuit, including: a receiver circuit which includes at least a receiver coil; and an impedance matching circuit which is coupled to the receiver circuit, including at least one impedance matching capacitor; wherein the resonant circuit is configured to operably receive a wireless power to generate an AC resonant signal between a positive resonant output node and a negative resonant output node, and the AC resonant signal includes an AC resonant voltage, and the AC resonant voltage has an amplitude; abridge rectifier circuit, configured to operably convert the AC resonant signal to generate a rectified output signal between a rectified output node and a ground node, wherein the rectified output signal includes a rectified output voltage and a rectified output current, wherein the bridge rectifier circuit includes at least four rectifier devices, wherein each of the four rectifier devices has a current outflow node and a current inflow node, wherein the four rectifier devices include a first rectifier device, a second rectifier device, a third rectifier device, and a forth rectifier device, and the current outflow nodes of the third rectifier device and the forth rectifier device are connected to each other at a rectified output node, and the current inflow nodes of the first rectifier device and the second rectifier device are connected to each other at a ground node, and the current inflow node of the third rectifier device and the current outflow node of the first rectifier device are connected to each other at the negative resonant output node, and the current inflow node of the forth rectifier device and the current outflow node of the second rectifier device are connected to each other at the positive resonant output node, wherein at least one of the four rectifier devices is a multi-mode switch, wherein the impedance matching capacitor is connected in series between the receiver circuit and the bridge rectifier circuit; the feedback control circuit includes: an error feedback circuit, configured to operably generate a voltage error feedback signal according to a voltage feedback signal related to the rectified output voltage and/or to generate a current error feedback signal according to a current feedback signal related to the rectified output current; and a switch control circuit, configured to operably generate a multi-mode switch control signal for controlling the multi-mode switch to operate at least in a portion of time in the Conductive Operation according to a voltage feedback signal related to the rectified output voltage and/or a current feedback signal related to the rectified output current so as to achieve the following functions: such that the voltage level of the rectified output voltage is substantially twice the amplitude of the AC resonant voltage; or to regulate the rectified output voltage at a level corresponding to a level of an output voltage reference signal, and/or to regulate the rectified output current at a level corresponding to a level of an output current reference signal.

In one embodiment, the feedback control circuit controls the multi-mode switch by the multi-mode switch control signal, such that the multi-mode switch operate in a time-divided combination of a Synchronous Rectifying Switching Operation, and a Conductive Operation to regulate the rectified output voltage at the level corresponding to the level of the output voltage reference signal, and/or to regulate the rectified output current at the level corresponding to the level of the output current reference signal.

In one embodiment, the feedback control circuit of further includes a synchronous control circuit which is configured to operably generate a synchronous control signal according to the rectified output signal and the AC resonant signal; wherein the switch control circuit generates the multi-mode switch control signal further according to the synchronous control signal.

From another perspective, the present invention provides a resonant wireless power conversion method, wherein a resonant circuit receives a wireless power and generates an AC resonant signal between a positive resonant output node and a negative resonant output node, wherein the AC resonant signal includes an AC resonant voltage, and the AC resonant voltage has an amplitude, and the resonant circuit includes an impedance matching capacitor; the resonant wireless power conversion method includes: controlling a bridge rectifier circuit to convert the AC resonant signal to generate a rectified output signal between a rectified output node and a ground node, wherein the rectified output signal includes a rectified output voltage and a rectified output current, wherein the bridge rectifier circuit includes at least four rectifier devices, wherein each of the four rectifier devices has a current outflow node and a current inflow node, wherein the four rectifier devices include a first rectifier device, a second rectifier device, a third rectifier device, and a forth rectifier device, and the current outflow nodes of the third rectifier device and the forth rectifier device are connected to each other at a rectified output node, and the current inflow nodes of the first rectifier device and the second rectifier device are connected to each other at a ground node, and the current inflow node of the third rectifier device and the current outflow node of the first rectifier device are connected to each other at the negative resonant output node, and the current inflow node of the forth rectifier device and the current outflow node of the second rectifier device are connected to each other at the positive resonant output node, wherein at least one of the four rectifier devices is a multi-mode switch; wherein the step of controlling a bridge rectifier circuit to convert the AC resonant signal to generate a rectified output signal includes: generating a multi-mode switch control signal according to a voltage feedback signal related to the rectified output voltage and/or a current feedback signal related to the rectified output current; and controlling the multi-mode switch to operate at least in a portion of time in the Conductive Operation by the multi-mode switch control signal, so as to achieve the following functions: (A) such that the voltage level of the rectified output voltage is substantially twice the amplitude of the AC resonant voltage; or (B) to regulate the rectified output voltage at a level corresponding to a level of an output voltage reference signal, and/or to regulate the rectified output current at a level corresponding to a level of an output current reference signal.

In one embodiment, the step of regulating the rectified output voltage at a level corresponding to a level of an output voltage reference signal, and/or to regulate the rectified output current at a level corresponding to a level of an output current reference signal includes: controlling the multi-mode switch by the multi-mode switch control signal, such that the multi-mode switch operate in a time-divided combination of a Synchronous Rectifying Switching Operation, and a Conductive Operation.

In one embodiment, the step of generating the multi-mode switch control signal further includes: generating asynchronous control signal according to the rectified output signal and the AC resonant signal; and generating the multi-mode switch control signal according to the synchronous control signal.

In one embodiment, the rectified output voltage is the voltage across an output capacitor which is connected between the rectified output node and the ground node, wherein when the level of the rectified output voltage is configured to be substantially twice the amplitude of the AC resonant voltage, the impedance capacitor is charged by the AC resonant voltage during a negative half wave voltage of AC resonant voltage, and the impedance capacitor charges the output capacitor during a positive half wave voltage of AC resonant voltage.

The objectives, technical details, features, and effects of the present invention will be better understood with regard to the detailed description of the embodiments below.

DESCRIPTION OF THE PREFERRED EMBODIMENTS

The drawings as referred to throughout the description of the present invention are for illustration only, to show the interrelations between the circuits and the signal waveforms, but not drawn according to actual scale.

Figure 1:
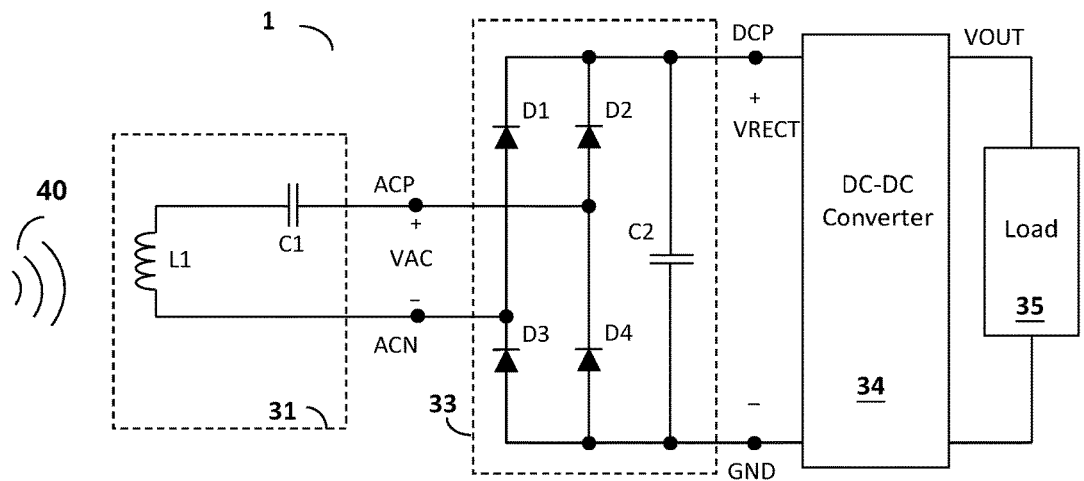
FIG. 1 shows a schematic diagram of a prior art resonant wireless power receiver circuit and the related circuits thereof.
Figure 2:
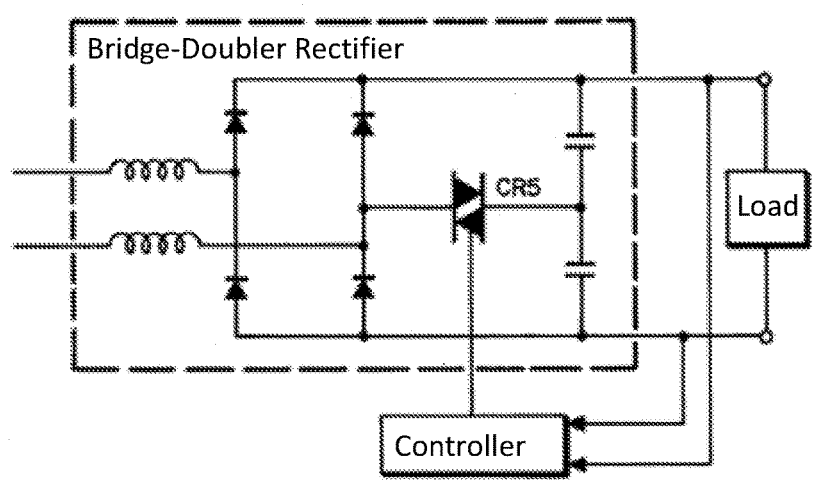
FIG. 2 shows a schematic diagram of a prior art bridge-doubler rectifier.
Figure 3A:
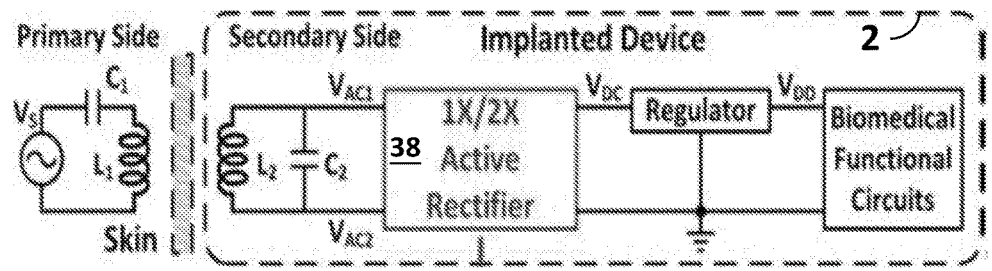
FIG. 3A shows a block diagram of a prior art resonant wireless power receiver circuit.
Figure 3B:
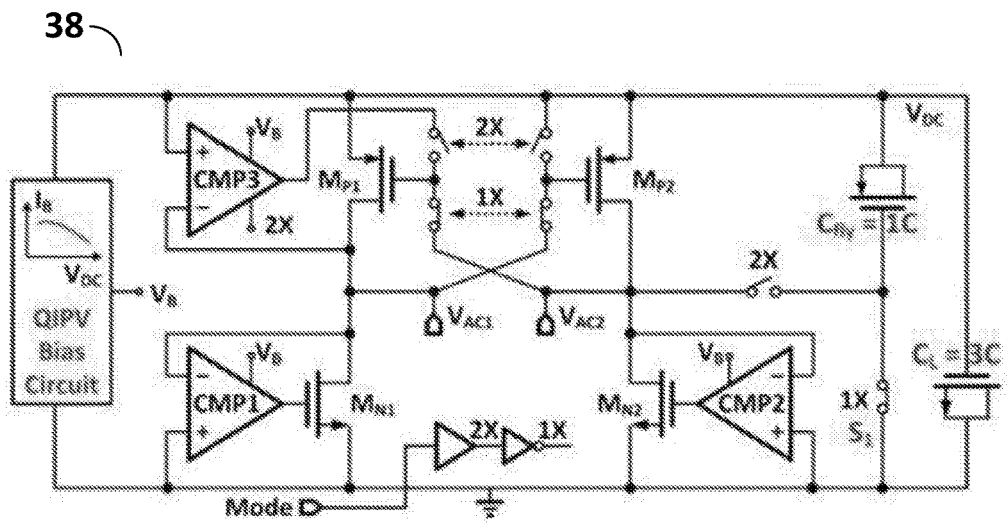
FIG. 3B shows a specific embodiment of the prior art 1×/2× active rectifier circuit shown in FIG. 3A.
Figure 4:
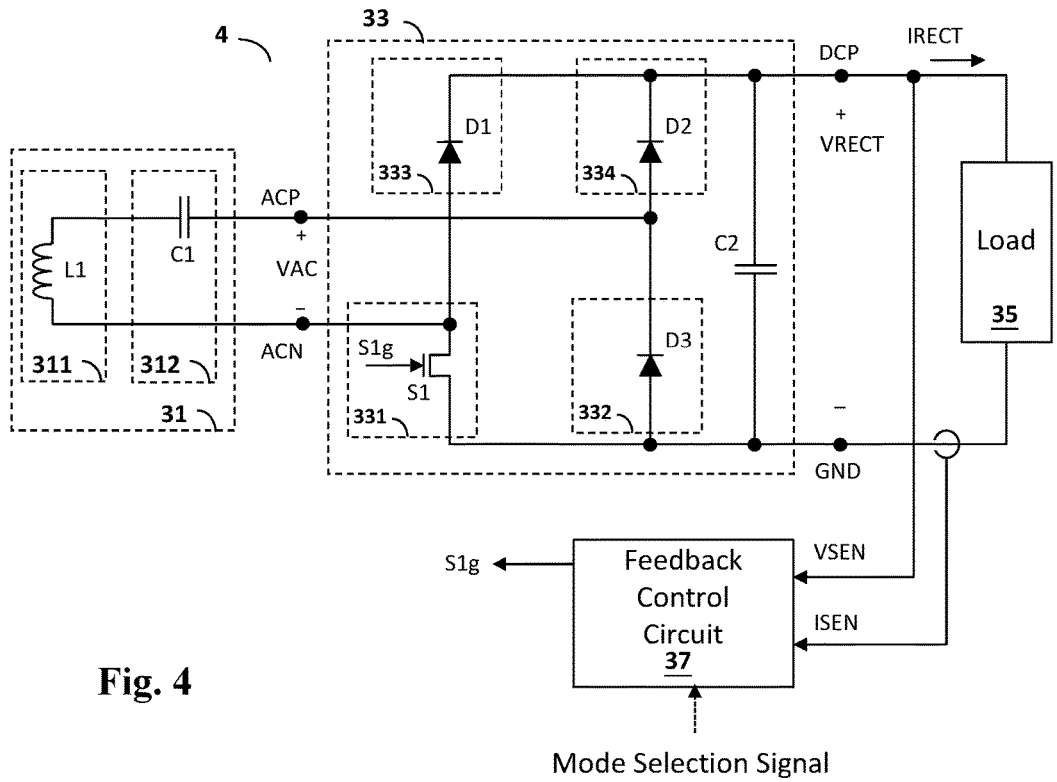
FIG. 4 shows a specific embodiment of the resonant wireless power receiver circuit according to the present invention.

FIG. 4 shows a specific embodiment of the resonant wireless power receiver circuit according to the present invention (resonant wireless power receiver circuit 4). The resonant wireless power receiver circuit 4 comprises a resonant circuit 31, a bridge rectifier circuit 33 and a feedback control circuit 37. The resonant circuit 31 includes a receiver circuit 311 and an impedance matching circuit 312, wherein the receiver circuit 311 includes a receiver coil L1 and the impedance matching circuit 312 includes at least one impedance matching capacitor C1. The resonant circuit 31 receives a wireless power to generate an AC resonant signal between a positive resonant output node ACP and a negative resonant output node ACN, wherein the AC resonant signal includes an AC resonant voltage VAC. The bridge rectifier circuit 33 rectifies and filters the AC resonant voltage VAC to generate a rectified output signal between a rectified output node DCP and a ground node GND for driving the load 35, thus achieving the wireless power transmission, wherein the rectified output signal includes a rectified output voltage VRECT and a rectified output current IRECT. The impedance matching capacitor C1 for example is connected in series between the receiver circuit 311 and the bridge rectifier circuit 33.

The bridge rectifier circuit 33 in this embodiment includes at least four rectifier devices, wherein each of the four rectifier devices has a current outflow node and a current inflow node. The four rectifier devices include first rectifier device 331, second rectifier device 332, third rectifier device 333, and forth rectifier device 334, wherein the current outflow nodes of the third rectifier device 333 and the forth rectifier device 334 are connected to each other at a rectified output node DCP. The current inflow nodes of the first rectifier device 331 and the second rectifier device 332 are connected to each other at a ground node GND. The current inflow node of the third rectifier device 333 and the current outflow node of the first rectifier device 331 are connected to each other at the negative resonant output node ACN, and the current inflow node of the forth rectifier device 334 and the current outflow node of the second rectifier device 332 are connected to each other at the positive resonant output node ACP. At least one of the four rectifier devices is a multi-mode switch. As in resonant wireless power receiver circuit 4 shown in FIG. 4, the first rectifier device 331 includes first multi-mode switch S1, and the other three rectifier devices includes a diode, that is, the rectifier devices 333, 334 and 332 include diodes D1, D2 and D3 respectively as shown in FIG. 4.

The feedback control circuit 37 is coupled to the bridge rectifier circuit 33 and is configured to generate a multi-mode switch control signal S1g for controlling the first multi-mode switch S1 according to a feedback signal (for example but not limited to a voltage feedback signal VSEN related to the rectified output voltage and/or a current feedback signal ISEN related to the rectified output current). This embodiment can achieve various operation modes, including a Rectifier Output Regulation Mode, a 1× Rectifier Mode, and a 2× Rectifier Mode, which will be explained in detail below.

Referring to FIG. 4, in one embodiment, the resonant wireless power receiver circuit 4 operates in the 1× Rectifier Mode. The feedback control circuit 37 generates the multi-mode switch control signals S1g for controlling the first multi-mode switch S1 to operate in a Synchronous Rectifying Switching Operation according to the AC resonant voltage VAC and the rectified output voltage VRECT. The "Synchronous Rectifying Switching Operation" means that the multi-mode switches are controlled to be conductive respectively when their respective voltage level of the current inflow node is higher than the voltage level of the current outflow node by a forward voltage difference, and not conductive respectively when their respective voltage level of the current inflow node is not higher than the voltage level of the current outflow node by a forward voltage difference, wherein the forward voltage difference is preferably higher than or equal to 0V. In this operation, the resonant wireless power receiver circuit 4 operates similarly to a conventional bridge rectifier, which can rectify the AC resonant voltage VAC to generate a rectified output signal between a rectified output node DCP and a ground node GND. The rectified output signal includes a rectified output voltage VRECT and a rectified output current IRECT, wherein the voltage level of the rectified output voltage VRECT is substantially the same (i.e. 1×) as an amplitude of the AC resonant voltage VAC, thus achieving the 1× Rectifier Mode. Note that although a 1× voltage is preferred, however due to non-idealities caused by for example imperfect matching among components or by the aforementioned forward voltage difference, the actual voltage level of the rectified output voltage VRECT may be close to but not exactly 1×, i.e. not exactly the same as the amplitude of the AC resonant voltage, so "substantially the same" in the context of the present invention does not require "exactly the same".

In one embodiment, each of the multi-switches (for example but not limited to the aforementioned first multi-mode switch S1) may be a semiconductor switch, for example but not limited to a MOSFET switch. When the first multi-mode switch S1 is a semiconductor switch, the aforementioned Synchronous Rectifying Switching Operation may also be performed by controlling the first multi-mode switch S1 to be not conductive. Since a semiconductor switch (e.g. MOSFET switch) inherently has a parasitic body diode, the first multi-mode switch S1 can still function for rectification even when they are not conductive if the parasitic body diode is in a proper direction, i.e., the anode of the parasitic body diode is connected to the current inflow node of the corresponding multi-mode switch and the cathode of the parasitic body diode is connected to the current outflow node of the corresponding multi-mode switch.

Referring to FIG. 4, in one embodiment, the resonant wireless power receiver circuit 4 can operate in the 2× Rectifier Mode. The feedback control circuit 37 generates the multi-mode switch control signal (e.g. the multi-mode switch control signal S1g of the resonant wireless power receiver circuit 4 as shown in FIG. 4) for controlling one of the four rectifier switches to be conductive (referred as a Conductive Operation in the context of this specification) according to the AC resonant signal and the rectified output signal (the AC resonant voltage VAC and the rectified output voltage VRECT in this embodiment). In Conductive Operation, the resonant wireless power receiver circuit 4 rectifies the AC resonant voltage VAC to generate the rectified output signal between the rectified output node DCP and the ground node GND, wherein the rectified output signal includes the rectified output voltage VRECT and the rectified output current IRECT, and the voltage level of the rectified output voltage VRECT is substantially twice (i.e. 2×) the amplitude of the AC resonant voltage, thus achieving the 2× Rectifier Mode. Note that although a 2× voltage is preferred, however due to non-idealities caused by for example imperfect matching among components or by the aforementioned forward voltage difference, the actual voltage level of the rectified output voltage VRECT may be close to but not exactly 2×, i.e. not exactly twice the amplitude of the AC resonant voltage, so "substantially twice" in the context of the present invention does not require "exactly twice".

Figure 5:
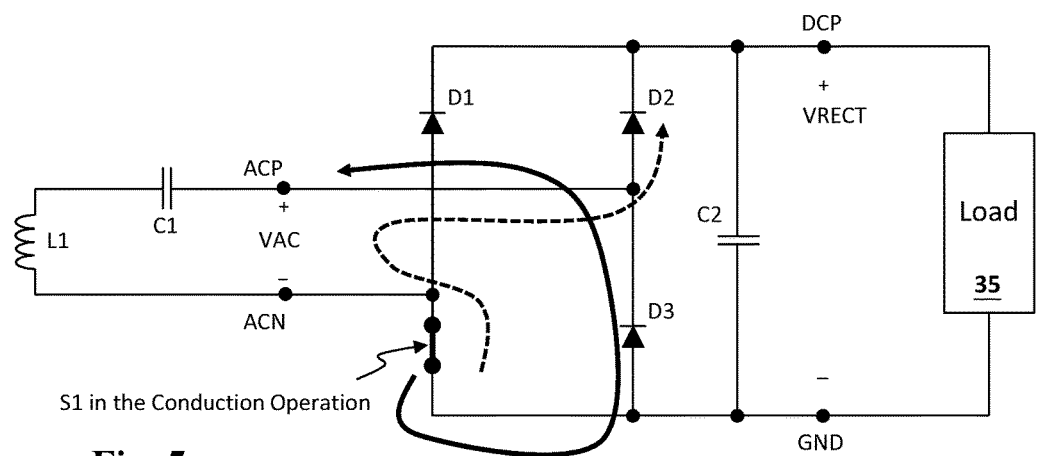
FIG. 5 shows an equivalent circuit diagram of the resonant wireless power receiver circuit shown in FIG. 4 according to the present invention.

FIG. 5 shows an equivalent circuit diagram of the resonant wireless power receiver circuit 4 shown in FIG. 4 when it is operating in the Conductive Operation. When the receiver coil L1 generates the negative half wave of the AC resonant voltage VAC, the current flows through the first multi-mode switch S1 and the diode D3 to charge energy to the impedance matching capacitor C1 (as the current direction in the solid line shown in the figure). When the receiver coil L1 generates the positive half wave of the AC resonant voltage VAC, the aforementioned energy stored in C1 and the energy in L1 will be released through the diode D2 and the first multi-mode switch S1 to charge an output capacitor C2 (as the current direction in the dashed line shown in the figure), which generates the rectified output voltage VRECT between the rectified output node DCP and the ground node GND, wherein the voltage level of the rectified output voltage VRECT is substantially twice (i.e. 2×) the amplitude of the AC resonant voltage, thus achieving the 2× Rectifier Mode.

Figure 6A:
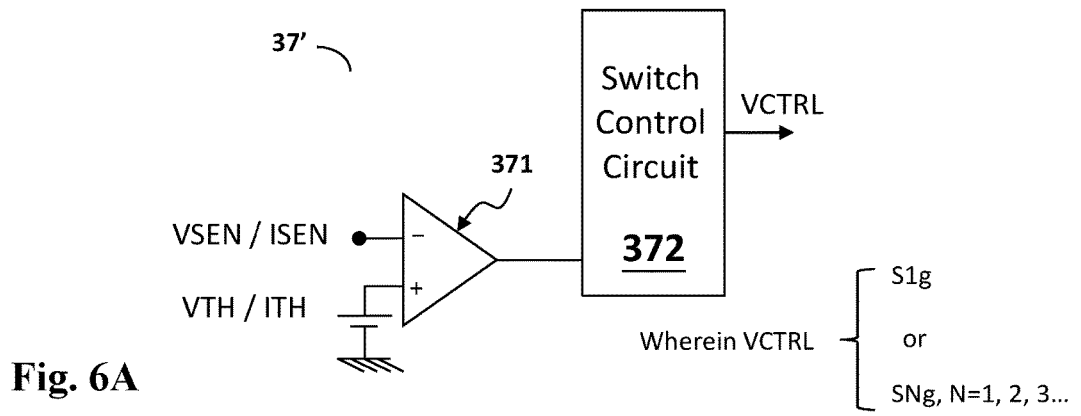
FIGS. 6A-6B show block diagrams of embodiments of the feedback control circuit of the resonant wireless power receiver circuit according to the present invention.

Referring to FIGS. 4 and 6A, in one embodiment, the resonant wireless power receiver circuit 4 can operate in the Rectifier Output Regulation Mode. FIG. 6A shows a more specific embodiment of the feedback control circuit (feedback control circuit 37') which can be used as the feedback control circuit 37 in FIG. 4. The feedback control circuit 37' includes an error feedback circuit 373, and a switch control circuit 372. The error feedback circuit 373 generates an error feedback signal EAO according to a difference between an output voltage reference signal VREF and the voltage feedback signal VSEN related to the rectified output voltage VRECT, or a difference between an output current reference signal IREF and the current feedback signal ISEN related to the rectified output current IRECT. The switch control circuit 372 generates the multi-mode switch control signal VCTRL to control the multi-mode switches (such as S1 in FIG. 4) according to the error feedback signal EAO, such that the first multi-mode switch S1 operates in a time-divided combination of the Synchronous Rectifying Switching Operation and the Conductive Operation to regulate the rectified output voltage VRECT corresponding to the output voltage reference signal VREF (i.e. such that the voltage feedback signal VSEN corresponds to the output voltage reference signal VREF), and/or to regulate the rectified output current IRECT corresponding to the output current reference signal IREF (i.e. such that the current feedback signal ISEN corresponds to the output current reference signal IREF). Thus, the Rectifier Output Regulation Mode is achieved.

The multi-mode switch control signal VCTRL includes one or plural control signals whose number corresponds to the number of the multi-mode switch (es) within the four rectifier devices, i.e. SNg, wherein N=1, 2, 3 . . . , which correspond to the multi-mode switches SN, wherein N=1, 2, 3 . . . , wherein N is a natural number and corresponds to the number of the multi-mode switches, the same hereinafter.

Figure 7:
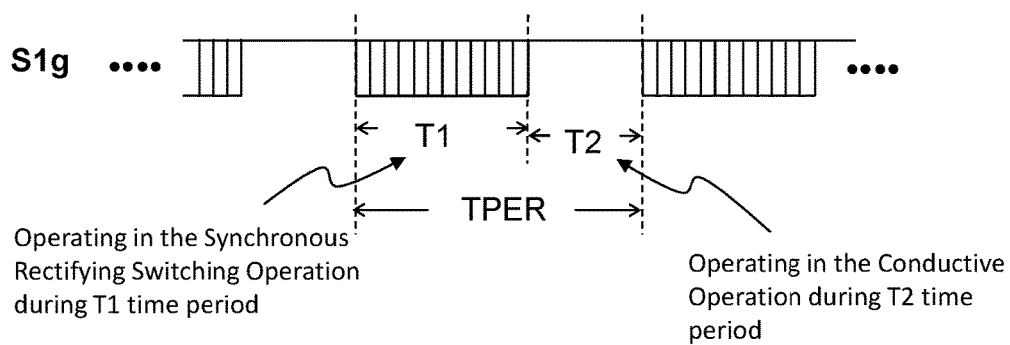
FIG. 7 shows simulation waveforms of the circuit shown in FIG. 5.

The term "time-divided combination" means that in one cycle period, two or more different operations are performed, sharing the time of the cycle period. More specifically, the "time-divided combination of the Synchronous Rectifying Switching Operation and the Conductive Operation" means that the first multi-mode switch S1 is controlled to operate, and switch between the Synchronous Rectifying Switching Operation and the Conductive Operation within a cycle period. For example, referring to the waveforms shown in FIG. 7, the cycle period TPER includes time periods T1 and T2, wherein both time periods T1 and T2 are smaller than TPER and larger or equal to zero, and the first multi-mode switch S1 is controlled to operate in the Synchronous Rectifying Switching Operation during the time period T1 and in the Conductive Operation during the time period T2, which is the so-called "time-divided combination", and such "time-divided combination" repeats periodically.

Note that the sequence of the time periods T1 and T2 in the cycle period TPER is only an example and can be modified. The cycle period TPER may be a pre-determined fixed length of time or an adjustable length of time. The cycle period TPER can be, but is not limited to being generated by an oscillator; or, one or more oscillators may be used to generate fixed or variable time periods T1 and/or T2, and the cycle period TPER can be a sum of the time periods T1 and T2. Thus, the cycle period TPER may be a pre-determined fixed or variable time period, or a time period which is determined according to the time periods T1 and T2.

Figure 6B:
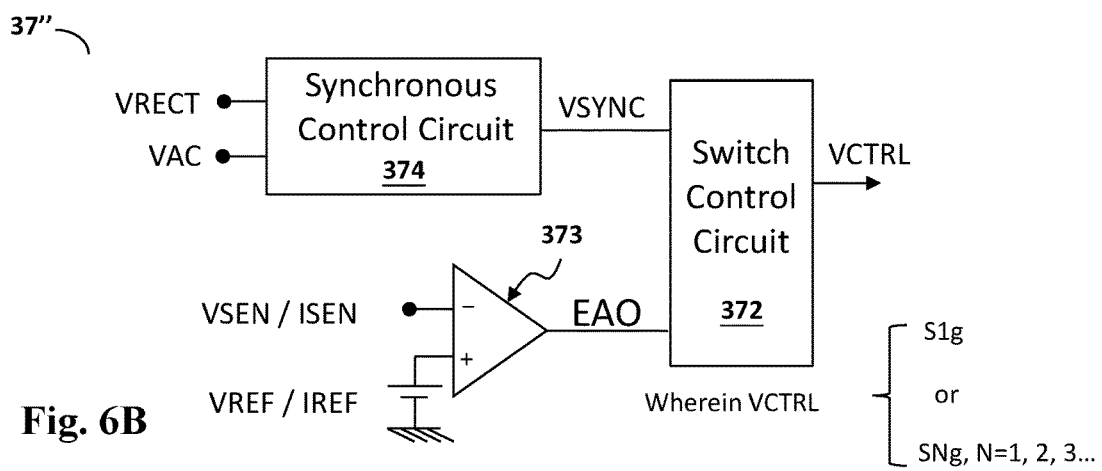

Referring to FIGS. 4 and 6B, FIG. 6B shows a more specific embodiment of the feedback control circuit (feedback control circuit 37") which can be used as the feedback control circuit 37 in FIG. 4. The feedback control circuit 37" includes an error feedback circuit 373, a synchronous control circuit 374, and a switch control circuit 372. The error feedback circuit 373 generates an error feedback signal EAO according to a difference between an output voltage reference signal VREF and the voltage feedback signal VSEN related to the rectified output voltage VRECT, or a difference between an output current reference signal IREF and the current feedback signal ISEN related to the rectified output current IRECT. The synchronous control circuit 374 generates a synchronous control signal VSYNC according to the rectified output signal and the AC resonant signal. The switch control circuit 372 generates the multi-mode switch control signal VCTRL to control the multi-mode switches (such as S1 in FIG. 4) according to the error feedback signal EAO and the synchronous control signal VSYNC, such that the first multi-mode switch S1 operates in a time-divided combination of the Synchronous Rectifying Switching Operation and the Conductive Operation to regulate the rectified output voltage VRECT corresponding to the output voltage reference signal VREF, and/or to regulate the rectified output current IRECT corresponding to the output current reference signal IREF. Thus, the Rectifier Output Regulation Mode is achieved.

It should be noted that: the aforementioned "2× Rectifier Mode" does not necessarily need a closed loop feedback control; the feedback control circuit 37 can be open-loop controlled (by for example by, but not limited to, a mode selection signal which is optional) to generate the multi-mode switch control signal VCTRL for controlling the multi-mode switches to achieve the 2× Rectifier Mode. In this case, the feedback control circuit 37 does not need to receive the voltage feedback signal VSEN and the current feedback signal ISEN. And, if it is only required to perform voltage regulation in the Rectifier Output Regulation Mode, the feedback control circuit 37 does not need to receive the current feedback signal ISEN; and if it is only required to perform current regulation in the Rectifier Output Regulation Mode, the feedback control circuit 37 does not need to receive the voltage feedback signal VSEN.

Figure 8:
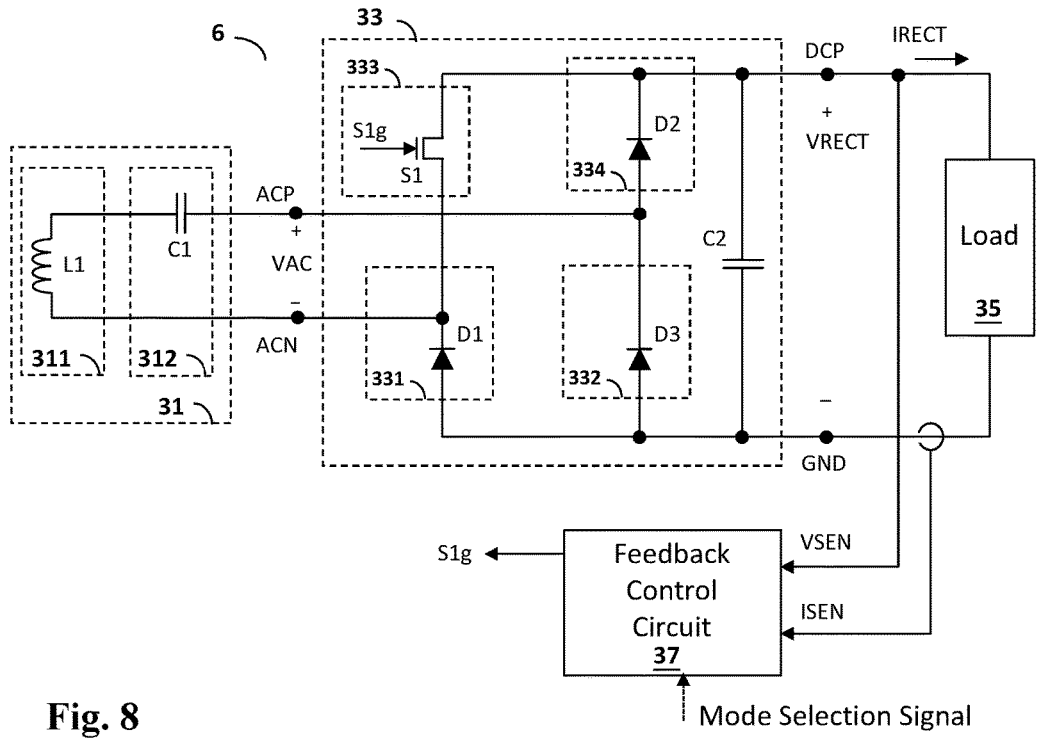
FIGS. 8-10 show several embodiments of the resonant wireless power receiver circuit according to the present invention.

FIG. 8 shows a specific embodiment of the resonant wireless power receiver circuit according to the present invention (resonant wireless power receiver circuit 6). This embodiment is similar to the resonant wireless power receiver circuit 4 in FIG. 4, but is different in that the positions and coupling relationships of the first multi-mode switch S1 and any one of the diodes of the resonant wireless power receiver circuit 4 in FIG. 4 are interchanged. The configuration shown in FIG. 8, of which the positions and coupling relationships of the first multi-mode switch S1 and the diode D1 in FIG. 4 are interchanged, can still achieve all the aforementioned operations. This embodiment illustrates that: the basic concept, which is an important feature of the present invention, is to provide at least a multi-mode switch which is controllable for the Conductive Operation, regardless of the number and position(s) of the multi-mode switch(es) in the bridge rectifier circuit.

Figure 9:
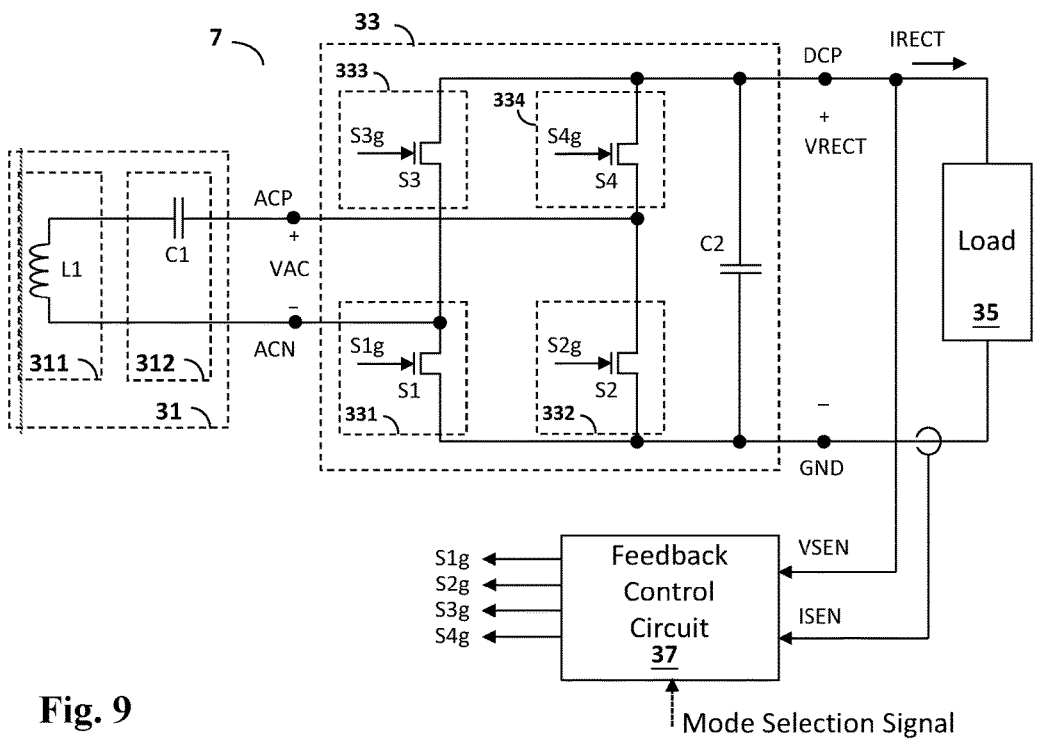

FIG. 9 shows a specific embodiment of the resonant wireless power receiver circuit according to the present invention (resonant wireless power receiver circuit 7). The resonant wireless power receiver circuit 7 is also similar to the resonant wireless power receiver circuit 4 in FIG. 4, but is different in that one or all of the diodes D1, D2 and D3 are replaced by multi-mode switches, for example the second multi-mode switch S2, the third multi-mode switch S3, and the forth multi-mode switch S4 in FIG. 9. These switches are controllable by the feedback control circuit 37 to operate in all the aforementioned operations and modes.

Figure 10:
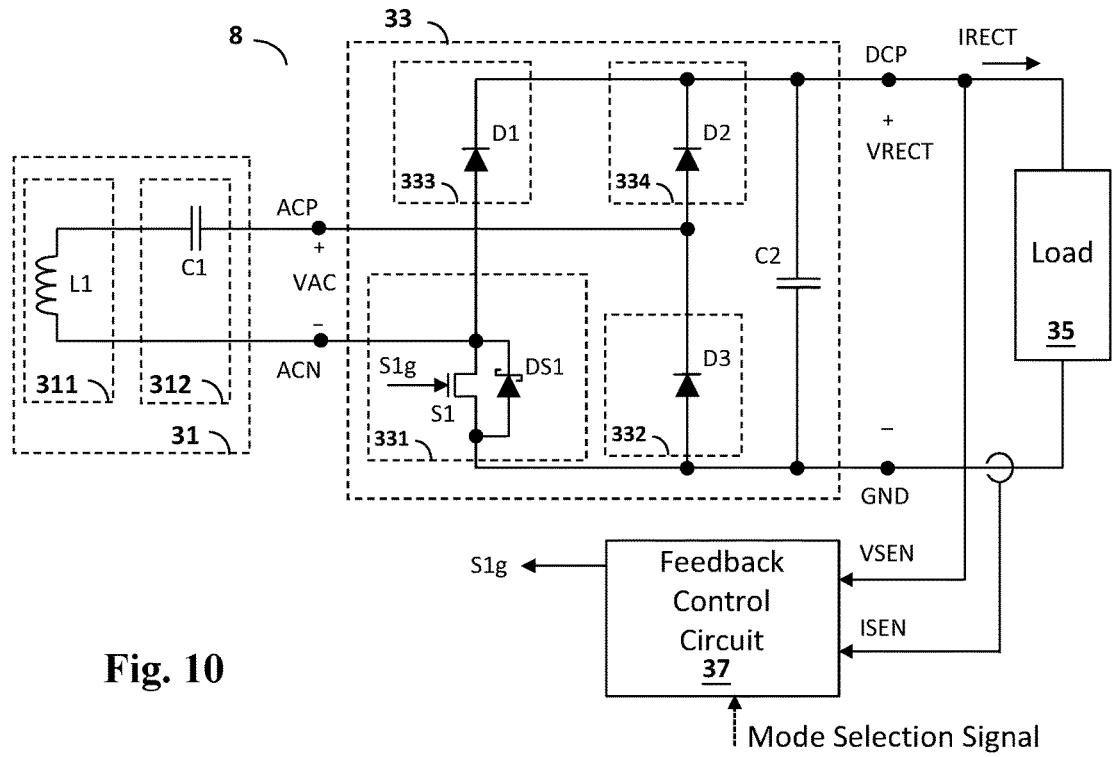

FIG. 10 shows an embodiment of the resonant wireless power receiver circuit according to the present invention, wherein any one of the multi-mode switches (for example the first multi-mode switch S1, the second multi-mode switch S2, the third multi-mode switch S3, and the forth multi-mode switch S4 in FIG. 9, and likewise for other multi-mode switches in the aforementioned embodiments) may be further connected in parallel with a bypass diode (for example DS1 in FIG. 10). The bypass diode preferably has a low forward voltage, such as a Schottky diode, so as to reduce the power loss caused by the forward voltage drop.

Figure 11:
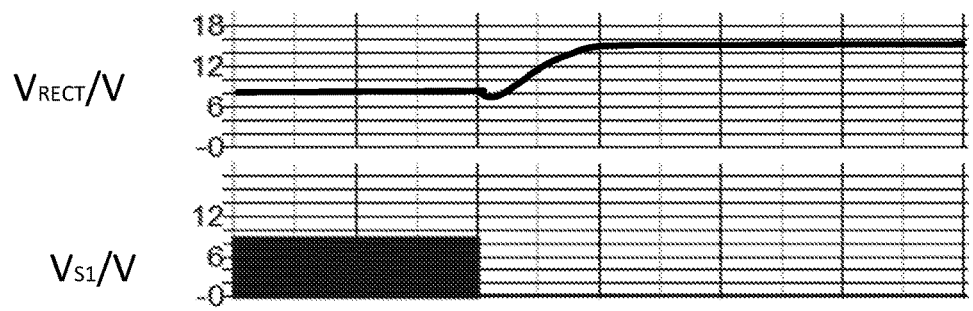
FIGS. 11-12 show simulation waveforms of the circuit shown in FIG. 5.

FIG. 11 shows waveforms of the resonant wireless power receiver circuit according to the present invention. As shown in the figure, before 3 mSec, the resonant wireless power receiver circuit (for example but not limited to the resonant wireless power receiver circuit 4) operates in the 1× Rectifier Mode, that is, the first multi-mode switch S1 operates in the Synchronous Rectifying Switching Operation to generate the 1× rectified output voltage VRECT (for example around 8V in FIG. 11) which is substantially the same as the amplitude of the AC resonant voltage VAC (not shown). In FIG. 11, VS1 shows the waveform of the voltage difference between the current inflow node and the current outflow node of the first multi-mode switch S1 when operating in the Synchronous Rectifying Switching Operation. After 3 mSec, as shown in the figure, the resonant wireless power receiver circuit 4 operates in the 2× Rectifier Mode, that is, the first multi-mode switch S1 operates in the Conductive Operation, such that the rectified output voltage VRECT rises to a 2× voltage (for example around 15V in FIG. 11) which is substantially twice the amplitude of the AC resonant voltage VAC (not shown). VS1 in FIG. 11 shows that the first multi-mode switch S1 is kept conductive, and the voltage difference between its current inflow node and its current outflow node is 0V as shown in the figure.

Figure 12:
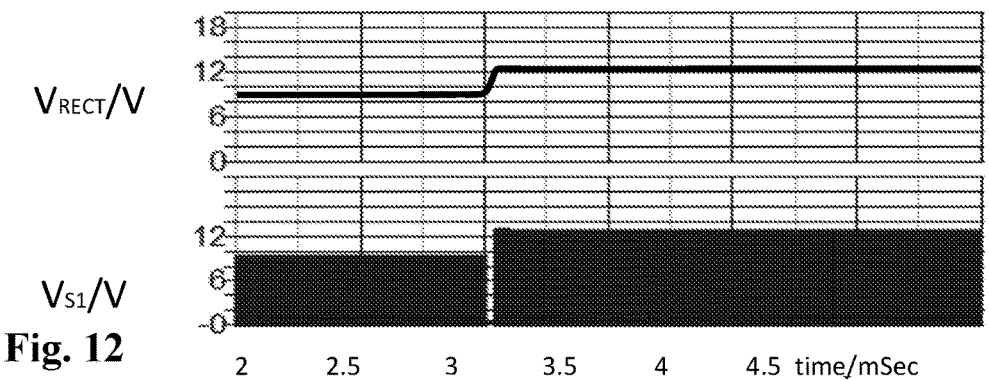

FIG. 12 shows waveforms of the resonant wireless power receiver circuit according to the present invention. As shown in the figure, before 3 mSec, the resonant wireless power receiver circuit (for example but not limited to the resonant wireless power receiver circuit 4) operates in the 1× Rectifier Mode, that is, the first multi-mode switch S1 operates in the Synchronous Rectifying Switching Operation to generate the 1× rectified output voltage VRECT (for example around 8V in FIG. 12) which is substantially the same as the amplitude of the AC resonant voltage VAC (not shown). The waveform VS1 in FIG. 12 shows the voltage difference between the current inflow node and the current outflow node of the first multi-mode switch S1 when operating in the Synchronous Rectifying Switching Operation. After 3 mSec, as shown in the figure, the resonant wireless power receiver circuit 4 operates in the "Rectifier Output Regulation Mode", that is, the first multi-mode switch S1 operates in a time-divided combination of the Synchronous Rectifying Switching Operation and the Conductive Operation, such that the rectified output voltage VRECT rises to a target level which corresponds to an output voltage reference signal, the target level for example being around 12V as shown in FIG. 12. The waveform VS1 shows the voltage difference between the current inflow node and the current outflow node of one of the first multi-mode switch S1 when operating in the time-divided combination of the Synchronous Rectifying Switching Operation and the Conductive Operation.

The aforementioned "multi-mode switch control signal" is used to represent not only individual multi-mode switch control signals, such as multi-mode switch control signal S1g, S2g . . . SNg (N=1, 2, . . . ), but also a set of multi-mode switch control signals, for example VCTRL.

The present invention has been described in considerable detail with reference to certain preferred embodiments thereof. It should be understood that the description is for illustrative purpose, not for limiting the scope of the present invention. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. As an example, when operating in the "Rectifier Output Regulation Mode", the rectified output voltage and the rectified output current can be regulated at the same time or in a time-divided manner, such that the rectified output voltage and the rectified output current are regulated according to their respective reference levels. Furthermore, those skilled in this art can readily conceive variations and modifications within the spirit of the present invention. For example, the diodes used as the rectifier devices in the embodiments can be replaced by Shottky diodes. As another example, in the embodiment of the bridge rectifier circuit 33 in FIG. 9, the Conductive Operation can be achieved by operating one of the multi-mode switches S2, S3 and S4, instead of the first multi-mode switch S1; or by operating the first multi-mode switch S1 in the Conductive Operation in one of the aforementioned cycle period and operating one of the multi-mode switches S2, S3 and S4 in another cycle period. As another example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. The spirit of the present invention should cover all such and other modifications and variations, which should be interpreted to fall within the scope of the following claims and their equivalents.

What is claimed is:

1. A resonant wireless power receiver circuit, comprising:
a resonant circuit, including:
a receiver circuit which includes at least a receiver coil; and
an impedance matching circuit which is coupled to the receiver circuit, including at least one impedance matching capacitor;
wherein the resonant circuit is configured to operably receive a wireless power to generate an AC resonant signal between a positive resonant output node and a negative resonant output node, and the AC resonant signal includes an AC resonant voltage, and the AC resonant voltage has an amplitude;
a bridge rectifier circuit, configured to operably convert the AC resonant signal to generate a rectified output signal between a rectified output node and a ground node, wherein the rectified output signal includes a rectified output voltage and a rectified output current, wherein the bridge rectifier circuit includes at least four rectifier devices, wherein each of the four rectifier devices has a current outflow node and a current inflow node, wherein the four rectifier devices include a first rectifier device, a second rectifier device, a third rectifier device, and a forth rectifier device, and the current outflow nodes of the third rectifier device and the forth rectifier device are connected to each other at a rectified output node, and the current inflow nodes of the first rectifier device and the second rectifier device are connected to each other at a ground node, and the current inflow node of the third rectifier device and the current outflow node of the first rectifier device are connected to each other at the negative resonant output node, and the current inflow node of the forth rectifier device and the current outflow node of the second rectifier device are connected to each other at the positive resonant output node, wherein at least one of the four rectifier devices is a multi-mode switch, wherein the impedance matching capacitor is connected in series between the receiver circuit and the bridge rectifier circuit; and
a feedback control circuit, configured to operably generate a multi-mode switch control signal for controlling the multi-mode switch to operate at least in a portion of time in the Conductive Operation according to a voltage feedback signal related to the rectified output voltage and/or a current feedback signal related to the rectified output current so as to achieve the following functions:
(A) such that the voltage level of the rectified output voltage is substantially twice the amplitude of the AC resonant voltage; or
(B) to regulate the rectified output voltage at a level corresponding to a level of an output voltage reference signal, and/or to regulate the rectified output current at a level corresponding to a level of an output current reference signal.

2. The resonant wireless power receiver circuit of claim 1, wherein the feedback control circuit controls the multi-mode switch by the multi-mode switch control signal, such that the multi-mode switch operate in a time-divided combination of a Synchronous Rectifying Switching Operation, and a Conductive Operation to regulate the rectified output voltage at the level corresponding to the level of the output voltage reference signal, and/or to regulate the rectified output current at the level corresponding to the level of the output current reference signal.

3. The resonant wireless power receiver circuit of claim 2, wherein the four rectifier devices are configured as (A), or (B), or (C), or (D):
(A) the four rectifier devices include a multi-mode switch and three diodes, wherein the anode and the cathode of each of the three diodes correspond to the current inflow node and the current outflow node of each of the three diodes respectively, and the feedback control circuit controls the multi-mode switch by the multi-mode switch control signal;
(B) the four rectifier devices include four multi-mode switches, wherein the feedback control circuit controls the four multi-mode switches by the multi-mode switch control signal;
(C) the four rectifier devices include a combination of a diode and three multi-mode switches, wherein the anode and the cathode of the diode correspond to the current inflow node and the current outflow node of the diode respectively, and the feedback control circuit controls the three multi-mode switches by the multi-mode switch control signal;
(D) the four rectifier devices include a combination of two diode and two multi-mode switches, wherein the anode and the cathode of the two diodes correspond to the current inflow node and the current outflow node of the two diodes respectively, and the feedback control circuit controls the two multi-mode switches by the multi-mode switch control signal.

4. The resonant wireless power receiver circuit of claim 1, wherein each of the multi-mode switches includes a semiconductor switch.

5. The resonant wireless power receiver circuit of claim 1, wherein the bridge rectifier circuit further includes one or plural bypass diodes of which the number corresponds to the number of the one or plural multi-mode diodes, and each of the multi-mode switches is connected to one individual diode of the one or plural bypass diodes in parallel respectively, and the anode and the cathode of each of the bypass diodes correspond to the current inflow node and the current outflow node of each of the multi-mode switches respectively.

6. The resonant wireless power receiver circuit of claim 1, further including an output capacitor which is connected between the rectified output node and the ground node, wherein when the level of the rectified output voltage is configured to be substantially twice the amplitude of the AC resonant voltage, the impedance capacitor is charged by the AC resonant voltage during a negative half wave voltage of AC resonant voltage, and the impedance capacitor charges the output capacitor during a positive half wave voltage of AC resonant voltage.

7. A resonant wireless power receiver circuit, comprising:
  a resonant circuit, including:
    a receiver circuit which includes at least a receiver coil; and
    an impedance matching circuit which is coupled to the receiver circuit, including at least one impedance matching capacitor;
    wherein the resonant circuit is configured to operably receive a wireless power to generate an AC resonant signal between a positive resonant output node and a negative resonant output node, and the AC resonant signal includes
  an AC resonant voltage, and the AC resonant voltage has an amplitude;
  a bridge rectifier circuit, configured to operably convert the AC resonant signal to generate a rectified output signal between a rectified output node and a ground node, wherein the rectified output signal includes a rectified output voltage and a rectified output current, wherein the bridge rectifier circuit includes at least four rectifier devices, wherein each of the four rectifier devices has a current outflow node and a current inflow node, wherein the four rectifier devices include a first rectifier device, a second rectifier device, a third rectifier device, and a forth rectifier device, and the current outflow nodes of the third rectifier device and the forth rectifier device are connected to each other at a rectified output node, and the current inflow nodes of the first rectifier device and the second rectifier device are connected to each other at a ground node, and the current inflow node of the third rectifier device and the current outflow node of the first rectifier device are connected to each other at the negative resonant output node, and the current inflow node of the forth rectifier device and the current outflow node of the second rectifier device are connected to each other at the positive resonant output node, wherein at least one of the four rectifier devices is a multi-mode switch, wherein the impedance matching capacitor is connected in series between the receiver circuit and the bridge rectifier circuit; and
  a control circuit, configured to operably generate a multi-mode switch control signal for controlling the multi-mode switch to operate in a Conductive Operation according to a mode selection signal, such that the voltage level of the rectified output voltage is substantially twice the amplitude of the AC resonant voltage.

8. The resonant wireless power receiver circuit of claim 7, further including an output capacitor which is connected between the rectified output node and the ground node, wherein when the level of the rectified output voltage is configured to be substantially twice the amplitude of the AC resonant voltage, the impedance capacitor is charged by the AC resonant voltage during a negative half wave voltage of AC resonant voltage, and the impedance capacitor charges the output capacitor during a positive half wave voltage of AC resonant voltage.

9. A feedback control circuit, configured to operably control a resonant wireless power receiver circuit which comprises: a resonant circuit, including:
  a receiver circuit which includes at least a receiver coil; and
  an impedance matching circuit which is coupled to the receiver circuit, including at least one impedance matching capacitor;
  wherein the resonant circuit is configured to operably receive a wireless power to generate an AC resonant signal between a positive resonant output node and a negative resonant output node, and the AC resonant signal includes an AC resonant voltage, and the AC resonant voltage has an amplitude;
  a bridge rectifier circuit, configured to operably convert the AC resonant signal to generate a rectified output signal between a rectified output node and a ground node, wherein the rectified output signal includes a rectified output voltage and a rectified output current, wherein the bridge rectifier circuit includes at least four rectifier devices, wherein each of the four rectifier devices has a current outflow node and a current inflow node, wherein the four rectifier devices include a first rectifier device, a second rectifier device, a third rectifier device, and a forth rectifier device, and the current outflow nodes of the third rectifier device and the forth rectifier device are connected to each other at a rectified output node, and the current inflow nodes of the first rectifier device and the second rectifier device are connected to each other at a ground node, and the current inflow node of the third rectifier device and the current outflow node of the first rectifier device are connected to each other at the negative resonant output node, and the current inflow node of the forth rectifier device and the current outflow node of the second rectifier device are connected to each other at the positive resonant output node, wherein at least one of the four rectifier devices is a multi-mode switch, wherein the impedance matching capacitor is connected in series between the receiver circuit and the bridge rectifier circuit; the feedback control circuit includes:
  an error feedback circuit, configured to operably generate a voltage error feedback signal according to a voltage feedback signal related to the rectified output voltage and/or to generate a current error feedback signal according to a current feedback signal related to the rectified output current; and
  a switch control circuit, configured to operably generate a multi-mode switch control signal for controlling the multi-mode switch to operate at least in a portion of time in the Conductive Operation according to a voltage feedback signal related to the rectified output voltage and/or a current feedback signal related to the rectified output current so as to achieve the following functions:
    (A) such that the voltage level of the rectified output voltage is substantially twice the amplitude of the AC resonant voltage; or
    (B) to regulate the rectified output voltage at a level corresponding to a level of an output voltage reference signal, and/or to regulate the rectified output current at a level corresponding to a level of an output current reference signal.

10. The feedback control circuit of claim 9, wherein the feedback control circuit controls the multi-mode switch by the multi-mode switch control signal, such that the multi-mode switch operate in a time-divided combination of a Synchronous Rectifying Switching Operation, and a Conductive Operation to regulate the rectified output voltage at the level corresponding to the level of the output voltage reference signal, and/or to regulate the rectified output current at the level corresponding to the level of the output current reference signal.

11. The feedback control circuit of claim 10, further including a synchronous control circuit which is configured to operably generate a synchronous control signal according to the rectified output signal and the AC resonant signal; wherein the switch control circuit generates the multi-mode switch control signal further according to the synchronous control signal.

12. The feedback control circuit of claim 9, wherein the four rectifier devices are configured as (A), or (B), or (C), or (D):
  (A) the four rectifier devices include a multi-mode switch and three diodes, wherein the anode and the cathode of each of the three diodes correspond to the current inflow node and the current outflow node of each of the three diodes respectively, and the feedback control circuit controls the multi-mode switch by the multi-mode switch control signal;
  (B) the four rectifier devices include four multi-mode switches, wherein the feedback control circuit controls the four multi-mode switches by the multi-mode switch control signal;
  (C) the four rectifier devices include a combination of a diode and three multi-mode switches, wherein the anode and the cathode of the diode correspond to the current inflow node and the current outflow node of the diode respectively, and the feedback control circuit controls the three multi-mode switches by the multi-mode switch control signal;
  (D) the four rectifier devices include a combination of two diode and two multi-mode switches, wherein the anode and the cathode of the two diodes correspond to the current inflow node and the current outflow node of the two diodes respectively, and the feedback control circuit controls the two multi-mode switches by the multi-mode switch control signal.

13. The feedback control circuit of claim 10, wherein the four rectifier devices are configured as (A), or (B), or (C), or (D):
  (A) the four rectifier devices include a multi-mode switch and three diodes, wherein the anode and the cathode of each of the three diodes correspond to the current inflow node and the current outflow node of each of the three diodes respectively, and the feedback control circuit controls the multi-mode switch by the multi-mode switch control signal;
  (B) the four rectifier devices include four multi-mode switches, wherein the feedback control circuit controls the four multi-mode switches by the multi-mode switch control signal;
  (C) the four rectifier devices include a combination of a diode and three multi-mode switches, wherein the anode and the cathode of the diode correspond to the current inflow node and the current outflow node of the diode respectively, and the feedback control circuit controls the three multi-mode switches by the multi-mode switch control signal;
  (D) the four rectifier devices include a combination of two diode and two multi-mode switches, wherein the anode and the cathode of the two diodes correspond to the current inflow node and the current outflow node of the two diodes respectively, and the feedback control circuit controls the two multi-mode switches by the multi-mode switch control signal.

14. The feedback control circuit of claim 9, wherein each of the multi-mode switches includes a semiconductor switch.

15. The feedback control circuit of claim 9, wherein the bridge rectifier circuit further includes one or plural bypass diodes of which the number corresponds to the number of the one or plural multi-mode diodes, and each of the multi-mode switches is connected to one individual diode of the one or plural bypass diodes in parallel respectively, and the anode and the cathode of each of the bypass diodes correspond to the current inflow node and the current outflow node of each of the multi-mode switches respectively.

16. A resonant wireless power conversion method, wherein a resonant circuit receives a wireless power and generates an AC resonant signal between a positive resonant output node and a negative resonant output node, wherein the AC resonant signal includes an AC resonant voltage, and the AC resonant voltage has an amplitude, and the resonant circuit includes an impedance matching capacitor; the resonant wireless power conversion method includes:
  controlling a bridge rectifier circuit to convert the AC resonant signal to generate a rectified output signal between a rectified output node and a ground node, wherein the rectified output signal includes a rectified output voltage and a rectified output current, wherein the bridge rectifier circuit includes at least four rectifier devices, wherein each of the four rectifier devices has a current outflow node and a current inflow node, wherein the four rectifier devices include a first rectifier device, a second rectifier device, a third rectifier device, and a forth rectifier device, and the current outflow nodes of the third rectifier device and the forth rectifier device are connected to each other at a rectified output node, and the current inflow nodes of the first rectifier device and the second rectifier device are connected to each other at a ground node, and the current inflow node of the third rectifier device and the current outflow node of the first rectifier device are connected to each other at the negative resonant output node, and the current inflow node of the forth rectifier device and the current outflow node of the second rectifier device are connected to each other at the positive resonant output node, wherein at least one of the four rectifier devices is a multi-mode switch;
  wherein the step of controlling a bridge rectifier circuit to convert the AC resonant signal to generate a rectified output signal includes:
    generating a multi-mode switch control signal according to a voltage feedback signal related to the rectified output voltage and/or a current feedback signal related to the rectified output current; and
    controlling the multi-mode switch to operate at least in a portion of time in the Conductive Operation by the multi-mode switch control signal, so as to achieve the following functions:
      (A) such that the voltage level of the rectified output voltage is substantially twice the amplitude of the AC resonant voltage; or
      (B) to regulate the rectified output voltage at a level corresponding to a level of an output voltage reference signal, and/or to regulate the rectified output current at a level corresponding to a level of an output current reference signal.

17. The resonant wireless power conversion method of claim 16, wherein the step of regulating the rectified output voltage at a level corresponding to a level of an output voltage reference signal, and/or to regulate the rectified output current at a level corresponding to a level of an output current reference signal includes:
controlling the multi-mode switch by the multi-mode switch control signal, such that the multi-mode switch operate in a time-divided combination of a Synchronous Rectifying Switching Operation, and a Conductive Operation.

18. The resonant wireless power conversion method of claim 16, wherein the step of generating the multi-mode switch control signal further includes:
generating a synchronous control signal according to the rectified output signal and the AC resonant signal; and
generating the multi-mode switch control signal according to the synchronous control signal.

19. The resonant wireless power conversion method of claim 16, wherein the four rectifier devices include (A), or (B), or (C), or (D):
(A) the four rectifier devices include a multi-mode switch and three diodes, wherein the anode and the cathode of each of the three diodes correspond to the current inflow node and the current outflow node of each of the three diodes respectively, wherein the step of controlling the bridge rectifier circuit includes controlling the multi-mode switch by the multi-mode switch control signal;
(B) the four rectifier devices include four multi-mode switches, wherein the step of controlling the bridge rectifier circuit includes controlling the four multi-mode switches by the multi-mode switch control signal;
(C) the four rectifier devices include a combination of a diode and three multi-mode switches, wherein the anode and the cathode of the diode correspond to the current inflow node and the current outflow node of the diode respectively, wherein the step of controlling the bridge rectifier circuit includes controlling the three multi-mode switches by the multi-mode switch control signal;
(D) the four rectifier devices include a combination of two diode and two multi-mode switches, wherein the anode and the cathode of the two diodes correspond to the current inflow node and the current outflow node of the two diodes respectively, wherein the step of controlling the bridge rectifier circuit includes controlling the two multi-mode switches by the multi-mode switch control signal.

20. The resonant wireless power conversion method of claim 17, wherein the four rectifier devices include (A), or (B), or (C), or (D):
(A) the four rectifier devices include a multi-mode switch and three diodes, wherein the anode and the cathode of each of the three diodes correspond to the current inflow node and the current outflow node of each of the three diodes respectively, wherein the step of controlling the bridge rectifier circuit includes controlling the multi-mode switch by the multi-mode switch control signal;
(B) the four rectifier devices include four multi-mode switches, wherein the step of controlling the bridge rectifier circuit includes controlling the four multi-mode switches by the multi-mode switch control signal;
(C) the four rectifier devices include a combination of a diode and three multi-mode switches, wherein the anode and the cathode of the diode correspond to the current inflow node and the current outflow node of the diode respectively, wherein the step of controlling the bridge rectifier circuit includes controlling the three multi-mode switches by the multi-mode switch control signal;
(D) the four rectifier devices include a combination of two diode and two multi-mode switches, wherein the anode and the cathode of the two diodes correspond to the current inflow node and the current outflow node of the two diodes respectively, wherein the step of controlling the bridge rectifier circuit includes controlling the two multi-mode switches by the multi-mode switch control signal.

21. The resonant wireless power conversion method of claim 18, wherein the four rectifier devices include (A), or (B), or (C), or (D):
(A) the four rectifier devices include a multi-mode switch and three diodes, wherein the anode and the cathode of each of the three diodes correspond to the current inflow node and the current outflow node of each of the three diodes respectively, wherein the step of controlling the bridge rectifier circuit includes controlling the multi-mode switch by the multi-mode switch control signal;
(B) the four rectifier devices include four multi-mode switches, wherein the step of controlling the bridge rectifier circuit includes controlling the four multi-mode switches by the multi-mode switch control signal;
(C) the four rectifier devices include a combination of a diode and three multi-mode switches, wherein the anode and the cathode of the diode correspond to the current inflow node and the current outflow node of the diode respectively, wherein the step of controlling the bridge rectifier circuit includes controlling the three multi-mode switches by the multi-mode switch control signal;
(D) the four rectifier devices include a combination of two diode and two multi-mode switches, wherein the anode and the cathode of the two diodes correspond to the current inflow node and the current outflow node of the two diodes respectively, wherein the step of controlling the bridge rectifier circuit includes controlling the two multi-mode switches by the multi-mode switch control signal.

22. The resonant wireless power conversion method of claim 16, wherein each of the multi-mode switches includes a semiconductor switch.

23. The resonant wireless power conversion method of claim 16, wherein the bridge rectifier circuit further includes one or plural bypass diodes of which the number corresponds to the number of the one or plural multi-mode diodes, and each of the multi-mode switches is connected to one individual diode of the one or plural bypass diodes in parallel respectively, and the anode and the cathode of each of the bypass diodes correspond to the current inflow node and the current outflow node of each of the multi-mode switches respectively.

24. The resonant wireless power conversion method of claim 16, wherein the rectified output voltage is the voltage across an output capacitor which is connected between the rectified output node and the ground node, wherein when the level of the rectified output voltage is configured to be substantially twice the amplitude of the AC resonant voltage, the impedance capacitor is charged by the AC resonant voltage during a negative half wave voltage of AC resonant voltage, and the impedance capacitor charges the output capacitor during a positive half wave voltage of AC resonant voltage.

* * * * *